US012191102B2

(12) United States Patent
Narciso et al.

(10) Patent No.: US 12,191,102 B2
(45) Date of Patent: Jan. 7, 2025

(54) DUAL-ELEMENT FUSE WITH CHEMICAL TRIGGER ELEMENT AND METHODS OF MANUFACTURE

(71) Applicant: EATON INTELLIGENT POWER LIMITED, Dublin (IE)

(72) Inventors: Venancio Esteban Narciso, Chihuahua (MX); Luis Adrian Tarin Leal, Chihuahua (MX); Luis Marcelo Sanchez Soltero, Chihuahua (MX)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/525,163

(22) Filed: Nov. 12, 2021

(65) Prior Publication Data

US 2023/0154715 A1 May 18, 2023

(51) Int. Cl.

| | |
|---|---|
| ***H01H 85/00*** | (2006.01) |
| ***H01H 85/11*** | (2006.01) |
| ***H01H 85/12*** | (2006.01) |
| ***H01H 85/38*** | (2006.01) |
| *H01H 85/47* | (2006.01) |

(52) U.S. Cl.

CPC ........ *H01H 85/11* (2013.01); *H01H 85/0039* (2013.01); *H01H 85/0056* (2013.01); *H01H 85/12* (2013.01); *H01H 85/38* (2013.01); *H01H 85/47* (2013.01)

(58) Field of Classification Search

CPC ............. H01H 85/10–12; H01H 85/38; H01H 2085/381; H01H 2085/383; H01H 2085/388; H01H 85/0039; H01H 85/0056; H01H 85/47

See application file for complete search history.

(56) References Cited

U.S. PATENT DOCUMENTS

| | | | | | |
|---|---|---|---|---|---|
| 3,148,257 | A * | 9/1964 | Feenan | H01H 85/055 | 337/296 |
| 3,601,737 | A * | 8/1971 | Baird | H01H 85/055 | 337/159 |
| 3,835,431 | A * | 9/1974 | Rosen | H01H 85/10 | 337/159 |
| 4,219,795 | A * | 8/1980 | Panaro | H01H 85/055 | 337/296 |
| 4,227,167 | A * | 10/1980 | Kozacka | H01H 85/12 | 337/296 |
| 4,625,195 | A * | 11/1986 | Robbins | H01H 85/055 | 337/279 |
| 5,596,306 | A * | 1/1997 | Kowalik | H01H 85/38 | 337/165 |
| 5,736,918 | A * | 4/1998 | Douglass | H01H 85/18 | 337/248 |
| 6,075,434 | A * | 6/2000 | Rueckling | H01H 85/11 | 337/296 |
| 6,160,471 | A * | 12/2000 | Rybka | H01H 85/055 | 337/276 |
| 6,570,482 | B2 | 5/2003 | Brown et al. | | |

(Continued)

*Primary Examiner* — Jacob R Crum
(74) *Attorney, Agent, or Firm* — Baker Botts L.L.P.

(57) ABSTRACT

An electrical fuse is provided. The electrical fuse includes a short circuit fusible element and a trigger element connected in series with the short circuit fusible element. The trigger element is chemically activated rather than mechanically activated to interrupt a predefined overload condition with a predetermined time delay.

20 Claims, 7 Drawing Sheets

(56) References Cited

U.S. PATENT DOCUMENTS

| | | | |
|---|---|---|---|
| 6,614,340 B2 | 9/2003 | Handcock et al. | |
| 9,697,976 B2 | 7/2017 | Katarki et al. | |
| 10,256,454 B2 * | 4/2019 | Yang | H01M 50/509 |
| 10,388,480 B2 | 8/2019 | Still et al. | |
| 11,075,047 B2 | 7/2021 | Douglass et al. | |
| 2002/0171532 A1 * | 11/2002 | Ackermann | H01H 85/0056 337/290 |
| 2009/0189730 A1 * | 7/2009 | Oh | H01H 85/10 337/186 |
| 2010/0176910 A1 * | 7/2010 | Knab | H01H 37/761 337/290 |
| 2015/0348731 A1 * | 12/2015 | Douglass | H01H 85/11 337/198 |
| 2016/0141140 A1 * | 5/2016 | Schmidt | H01H 85/1755 337/187 |
| 2018/0138005 A1 | 5/2018 | Zhou et al. | |

* cited by examiner

DUAL-ELEMENT FUSE WITH CHEMICAL TRIGGER ELEMENT AND METHODS OF MANUFACTURE

BACKGROUND OF THE DISCLOSURE

The field of the disclosure relates generally to electrical circuit protection fuses and, more specifically, to dual-element time-delay fuses.

Fuses are widely used as overcurrent protection devices to prevent costly damage to electrical circuits. Fuse terminals typically form an electrical connection between an electrical power source or power supply and an electrical component or a combination of components arranged in an electrical circuit. One or more fusible links or elements, or a fuse element assembly, is connected between the fuse terminals, so that when electrical current flowing through the fuse exceeds a predetermined limit, the fusible elements melt and open one or more circuits through the fuse to prevent electrical component damage.

So-called dual-element, time-delay fuses are known that include a high overcurrent fuse element and a low overcurrent fuse element inside a housing of the fuse and connected in series to one another inside the fuse. The low overcurrent fuse element includes a mechanical device, often referred to in the art as a fuse trigger, that will electrically open a circuit path through the low overcurrent fuse element during an overload condition after a specified amount of time. Such mechanical fuse triggers are effective to prevent electrical overload conditions from passing to upstream fuses in an electrical power system that would otherwise not cause the high overcurrent fuse element to open, and facilitate selective coordination of overcurrent protection devices to ensure reliability of electrical power systems supplying power to vital loads.

Conventional designs for mechanical fuse trigger devices in dual-element, time-delay fuses present a number of challenges from a manufacturing perspective, and improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION

Figure 1A:
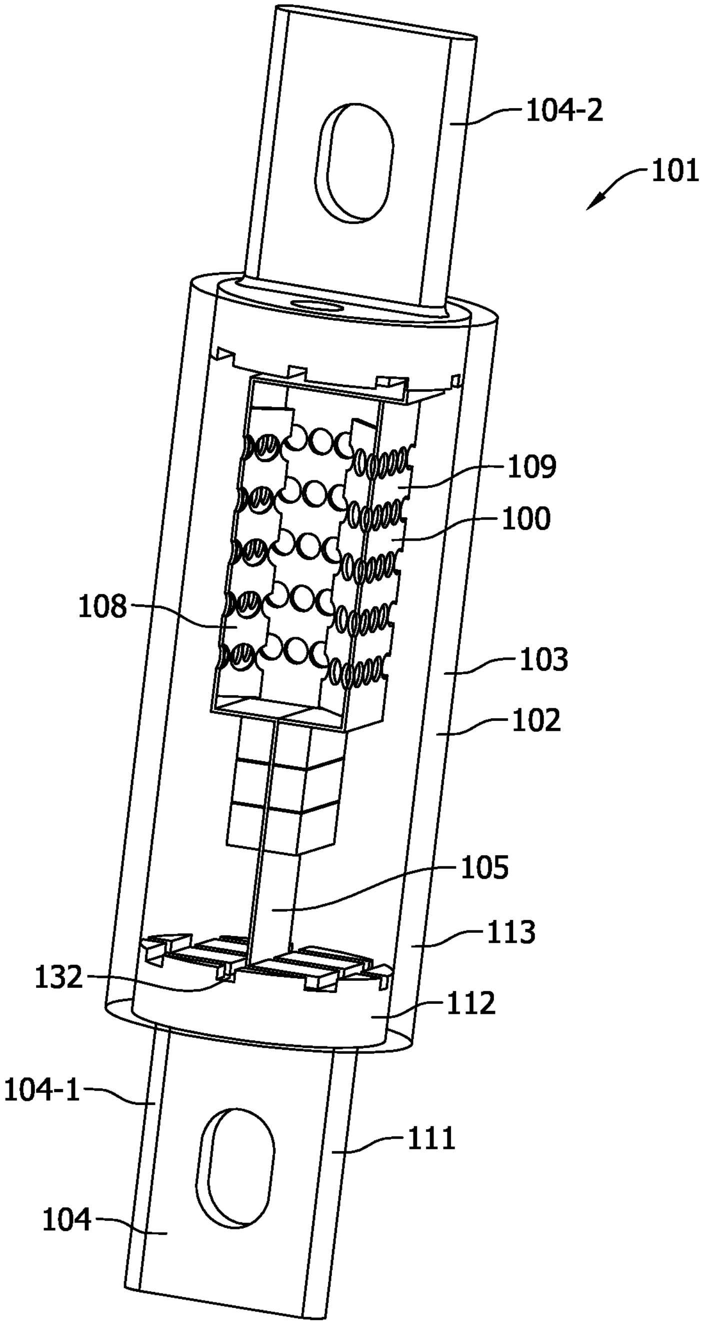
FIG. 1A is a perspective view of an exemplary electrical fuse.

Conventional designs for mechanical fuse trigger devices in dual-element, time-delay fuses present a number of challenges from a manufacturing perspective. Manufacturers are seeking fuse trigger devices with less components for manufacturing simplicity and cost reduction. Providing fuse trigger devices that can handle electrical overcurrents, while still providing acceptable interruption performance when subjected to electrical overcurrents for a specified amount of time and requiring fewer manufacturing components, is challenging. Improvements are needed to meet the long-standing and unfulfilled needs in the art.

In known dual-element fuses, the fuse includes a short circuit fusible element and a mechanical trigger. The short circuit fusible element opens a circuit path in the event of a high overcurrent condition such as a short circuit condition. The mechanical trigger electrically opens the circuit in the event of a low overcurrent condition after a period of time. The short circuit fusible element and the mechanical trigger are electrically connected in series with one another through a solder and a plunger, which is coupled with a spring. The mechanical trigger also includes a heater. When overload current flows through the fusible element for a period of time, heat generated by the overload current heats the heater, which in turn heats and melts the solder. Without the mechanical force from the solid solder to hold the plunger with the short circuit fusible element, the spring pulls the plunger away and disconnects the mechanical trigger from the short circuit fusible element.

Manufacture of the mechanical trigger is relatively complicated and expensive because the mechanical trigger includes a relatively high number of complicated mechanical parts and are typically manually assembled. While functionally effective to open a circuit in a low overcurrent condition, manual assembling of the components is relatively difficult, time consuming, and expensive. Manual assembling also tends to present undesirable performance variation and reliability issues. In addition, because the amount of heat generated by the current changes at different rated current, the heater needs to be modified for different current ratings. For example, the width and/or thickness of the heater is adjusted for each current rating. In other words, for each current rating, the design of the mechanical trigger would need to be adjusted for a known electrical fuse having a mechanical trigger. Accordingly, improved elements and methods of manufacture of dual-element fuses are desired.

Electrical fuse elements and methods of manufacture described herein advantageously reduce the number of components needed to manufacture the trigger element of the electrical fuse, while also reducing the need to change the designs of the trigger element for each current rating of the electrical fuses. While described below in reference to particular embodiments, such description is intended for illustration rather than limitation. The significant benefit of the inventive concepts will now be explained in reference to the exemplary embodiments illustrated in the Figures. Method aspects will be in part apparent and in part explicit in the following discussion.

Figure 1B:
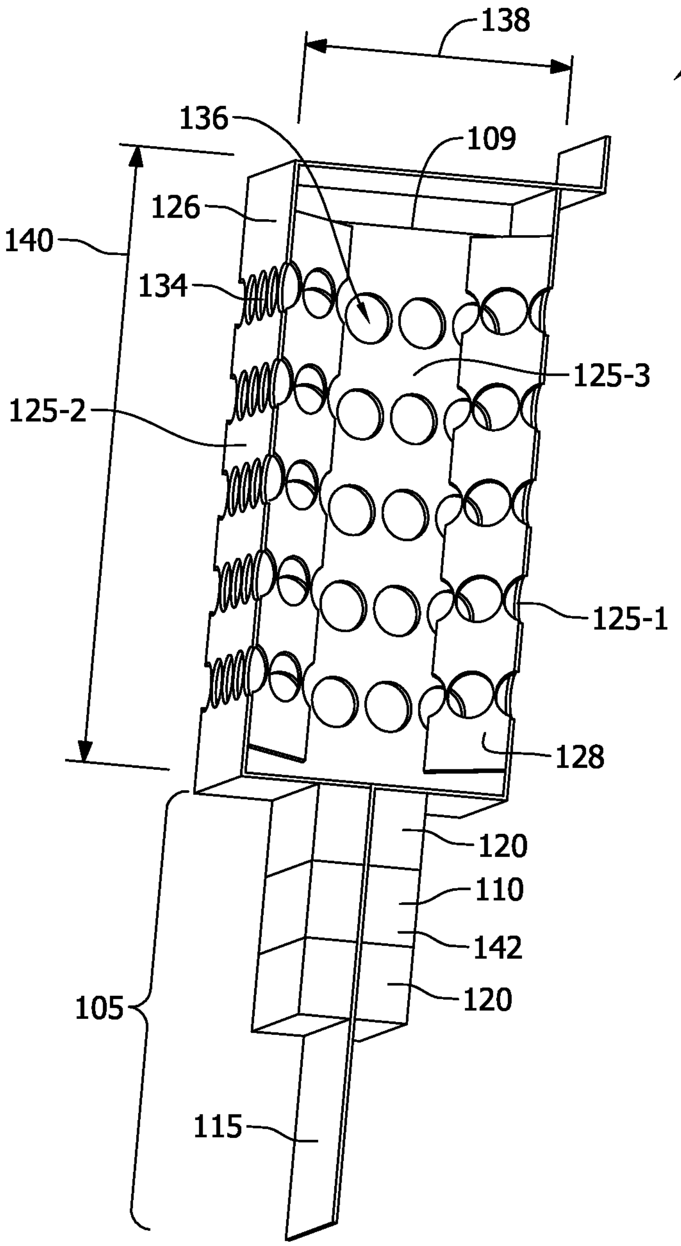
FIG. 1B is a perspective view of an exemplary fuse element assembly of the electrical fuse shown in FIG. 1A
Figure 1C:
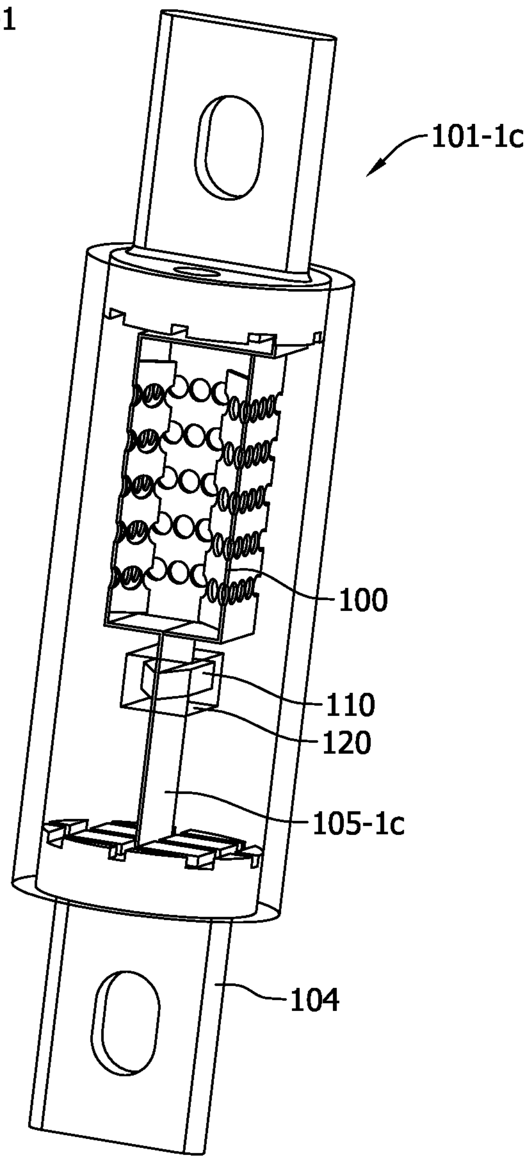
FIG. 1C is a perspective view of another exemplary electrical fuse.
Figure 1D:
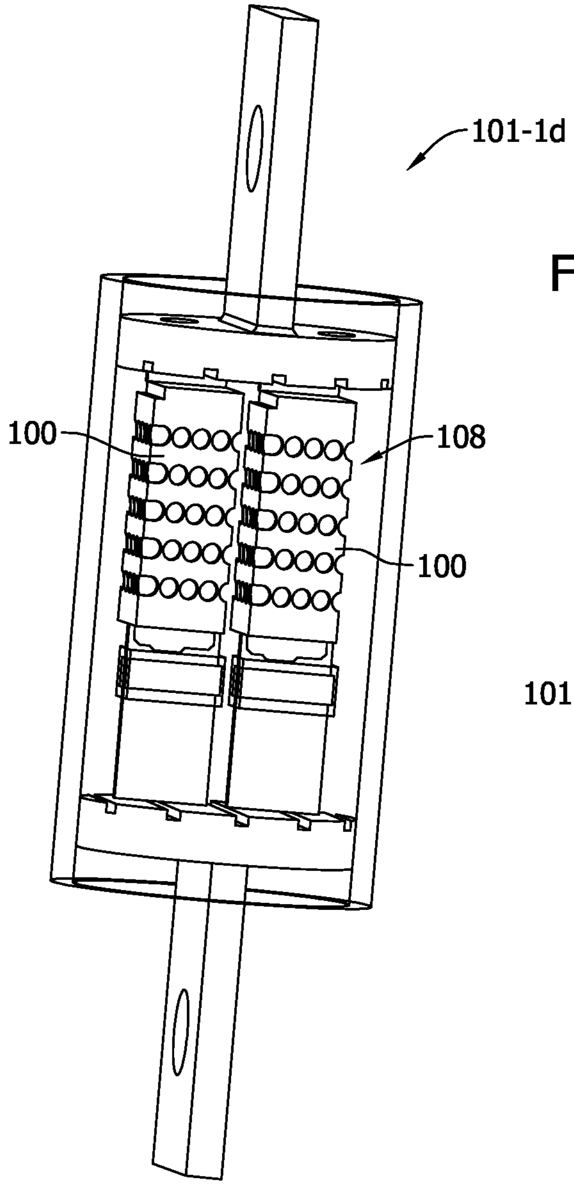
FIG. 1D is a perspective view of one more exemplary electrical fuse.
Figure 1E:
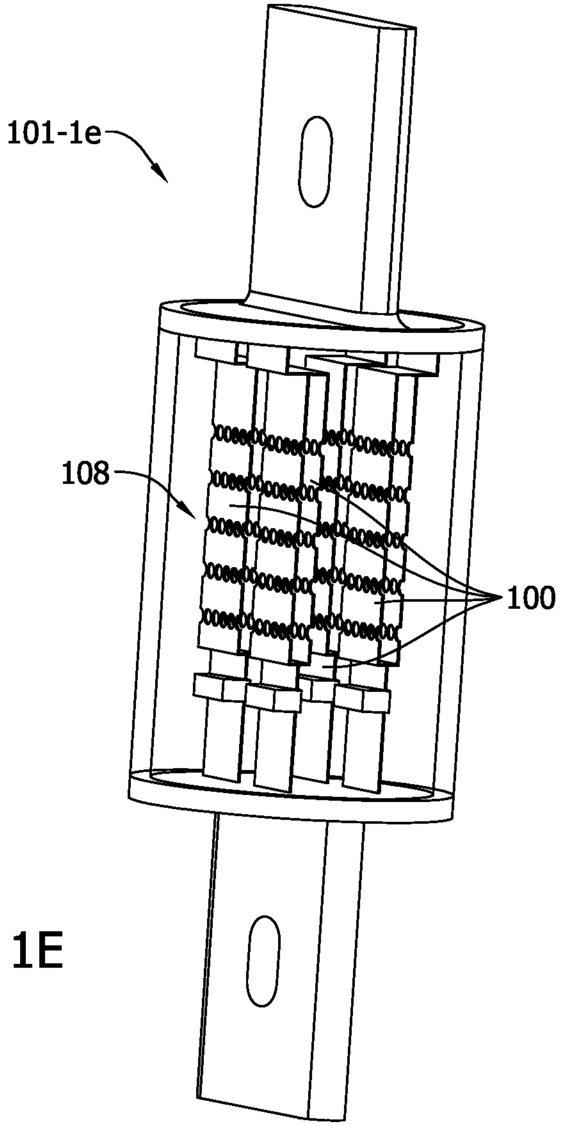
FIG. 1E is a perspective view of one more exemplary electrical fuse.

FIGS. 1A-1E show exemplary electrical fuses 101 and an exemplary fusible element 100 of the fuse 101. FIG. 1A is a schematic diagram of an exemplary embodiment of the fuse 101. FIG. 1B is a perspective view of the fusible element 100. FIGS. 1C-1E show more exemplary embodiments of the fuse 101. The fuse 101 is a dual-element fuse or a time delay fuse.

In the exemplary embodiment, the power fuse 101 includes a fuse body 103 and terminal assemblies 104. The fuse 101 includes two terminal assemblies 104, a first terminal assembly 104-1 and a second terminal assembly 104-2. The terminal assemblies 104-1, 104-2 may be the same or different from one another. The fuse body 103 includes a housing 102 and the fuse element assembly 108. The fuse element assembly 108 includes one fusible element 100 (FIGS. 1A and 1C). The fuse element assembly 108 is positioned inside the housing 102. In some embodiments, the fuse element assembly 108 includes one or more fusible elements 100 extending through the fuse body 103 between terminal assemblies 104-1, 104-2 (FIGS. 1D and 1E).

In the exemplary embodiment, the terminal assembly 104 includes a terminal 111 and an end bell 112. The terminal 111 is configured to connect the fuse 101 to a line- or load-side circuitry. The terminal 111, sometimes referred to as a blade or a knife blade, extends outwardly from the end bell 112. The end bell 112 is received in an end 113 of the fuse body 103. The electrical connection of the fuse element assembly 108 is completed through the end bells 112 and the terminals 111 such that when electrical current flowing through the fuse 101 exceeds a predetermined limit, fusible elements 100 of the fuse element assembly 108 melt, disintegrate, or otherwise structurally fail and open the circuit path through the fuse 101 to prevent electrical component damage. The load-side circuitry is therefore electrically isolated from the line-side circuitry to protect load-side circuit components from damage when electrical fault conditions occur.

The fuse 101 may further include an arc extinguishing filler (not shown). The terminal assembly 104 may further include a filler hole (not shown) in the end bell 112 to facilitate the introduction of the arc extinguishing filler. The arc extinguishing filler surrounds at least part of the fuse element assembly 108 and is configured to block or mitigate arcing. The arc extinguishing filler may be fabricated from quartz silica sand and a sodium silicate binder. The quartz sand has a relatively high heat conduction and absorption capacity in its loose compacted state, but may be silicated to provide improved performance. For example, a liquid sodium silicate solution is added to the sand and then the free water is dried off.

In the exemplary embodiment, the first terminal assembly 104-1 has grooves 132 for accommodating a short circuit fusible element 109 of the fusible element 100, and the second terminal assembly 104-2 has grooves 132 in a different pattern for coupling to a trigger element 105 of the fusible element 100. Alternatively, the terminal assemblies 104 have the same number and patterns of grooves 132, In the exemplary embodiment, the fusible element 100 includes the short circuit fusible element 109 and the trigger element 105. The short circuit fusible element 109 is connected in series with the trigger element 105. The connection in series facilitates overcurrent protection of electrical devices connected to the power system. The trigger element 105 activates chemically to interrupt a predefined overload condition with a predetermined time delay, where under a predefined overload condition, the trigger element 105 interrupts the circuit through the fuse 101 after a predetermined time delay, and the interruption is caused by chemical reaction of components in the trigger element 105.

In the exemplary embodiments, the short circuit fusible element 109 includes a first perforated wall 125-1 extending between a first end 126 and a second end 128 of the short circuit fusible element 109 (FIG. 1B). The short circuit fusible element 109 may further include a second perforated wall 125-2 extending in spaced apart but generally parallel planes to the first perforated wall 125. The short circuit fusible element 109 may further include a third perforated wall 125-3 extending perpendicularly to and between the first perforated wall 125 and the second perforated wall 125-2. The perforated wall 125 is fabricated from a metal or metal alloy such as copper and copper alloy. The perforated wall 125 defines a plurality of linear arrangements 134 of perforations 136. Each linear arrangement 134 extends across the widthwise dimension 138 of the perforated wall. The linear arrangements 134 are spaced apart from one another in the lengthwise dimension 140.

The perforations defines weak spots, which has thin sections than other areas of the short circuit fusible element 109. When subject to high overcurrent conditions, including but not necessarily limited to a short circuit condition, the short circuit fusible element 109 opens at the weak spots before the trigger element 105 responds. Opening of the short circuit fusible element 109 protects circuitry connected to the fuse from an otherwise damaging high overcurrent condition.

In the exemplary embodiment, the trigger element 105 extends parallel to the first perforated wall 125 and the second perforated wall 125. The trigger element 105 includes an elongated metal element 115. The elongated metal element 115 is freestanding, where the elongated metal element 115 is not extended from the short circuit fusible element 109 or the terminal assembly 104, and is formed separately from the short circuit fusible element 109. The metal element may be a planar sheet metal element 115. The elongated metal element 115 is fabricated from copper or copper alloy. The trigger element 105 further includes a Metcalf-effect (M-effect) element 142, where a portion of the elongated metal element 115 is overlaid with a low melting-point metal material 110. The low melting-point metal material 110 has a lower melting point than the elongated metal element 115. An M-effect occurs when a low-melting point metal (e.g., tin) is disposed on a high-melting point metal (e.g., copper) and under an overload condition, melts and diffuses into the high-melting point metal, reducing the melting point of the high-melting point metal. Tin and copper are used herein as examples only. Other low-melting point metal or metal alloy or other high-melting point metal or metal alloy may be used in M-effect element 142. The low melting-point metal material 110 is fabricated from tin or tin with a small percentage, such as less than 3%, of silver to further reduce the melting temperature of the metal.

In the exemplary embodiment, the trigger element 105 further includes an arc barrier material 120. The arc barrier material 120 may be positioned between the metal material 110 and the short circuit fusible element 109. The arc barrier material 120 may also be positioned at opposite sides of the metal material 110. The arc barrier material 120 may include a silicone material. In some embodiments, the arc barrier material 120 further includes room temperature vulcanizing silicones or UV curing silicones. The arc barrier material 120 blocks or mitigate arc burn.

In operation, under an overload condition, the low melting-point metal material 110 melts and diffuses into the elongated metal element 115 in an attempt to form a eutectic material. The result is a lower melting temperature somewhere between that of copper and tin. That is, the elongated metal element 115 at the M-effect element 142 melts at a temperature lower than the melting temperature at which the elongated metal element 115 by itself melts. As a result, the trigger element 105 responds to an overload condition by interrupting the circuit at the M-effect element 142. Electric arc may form after the trigger element 105 opens at the M-effect element 142. The arc barrier material 120 provides barrier to the arc.

The trigger element 105 may be assembled separately from the short circuit fusible element 109. That is, during assembling of the fuses 101, the trigger elements 105 are preassembled and may be assembled with various short circuit fusible elements, besides the short circuit fusible elements 109 described above.

FIG. 1C shows the fuse 101 having another exemplary embodiment of trigger element 105-1*c*. Compared to the trigger element 105 shown in FIGS. 1A and 1B, where the metal material 110 is positioned between arc barrier material 120, the arc barrier material 120 surrounds the metal material 110 in the trigger element 105-1*c*, blocking or mitigating arcing from the metal material 110. The arc barrier material 120 may be in other configurations that enable the arc barrier material 120 to function as described herein.

Figure 2A:
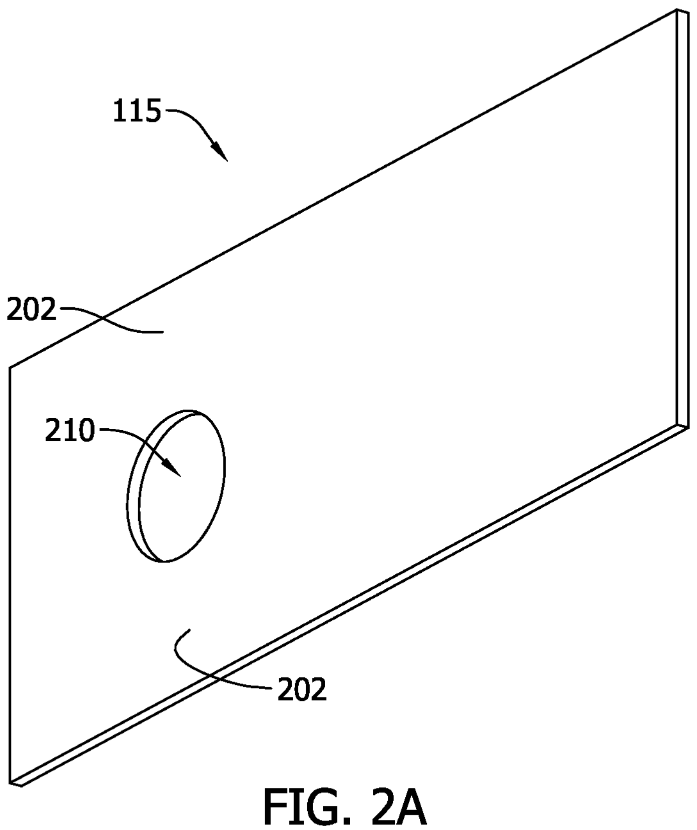
FIG. 2A is a perspective view of an exemplary elongated metal element of the electrical fuses shown in FIGS. 1A and 1C-1E.
Figure 2B:
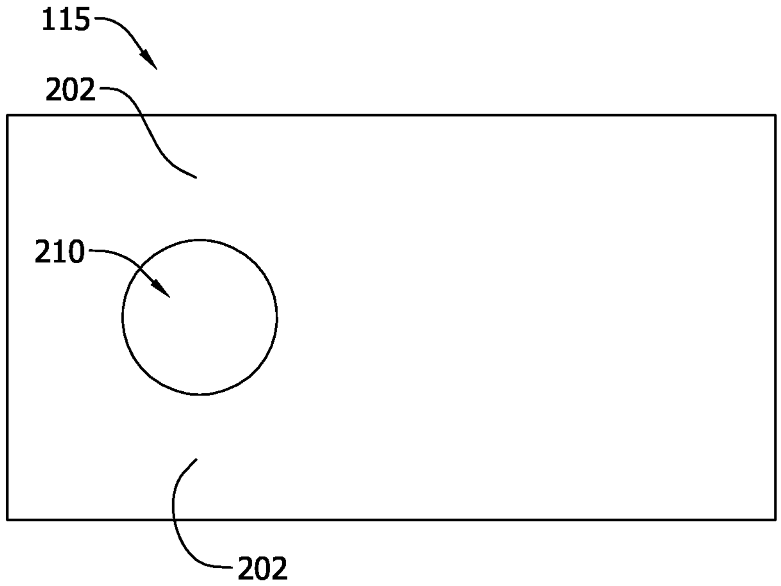
FIG. 2B is a top view of the metal element shown in FIG. 2A.

FIGS. 1D and 1E show the fuse element assembly 108 of the fuse 101-1*d*, 101-1*e* having a plurality of fusible elements 100, to increase the current rating of the fuse 101. The plurality of fusible elements 100 are connected in parallel with one another. The fuse 101-1*d* includes two fusible elements 100 to double the current rating of the fuse 101. The fuse 101-1*e* includes four fusible elements 100 to quadruple the current rating of the fuse 101. For example, if the fuse 101-1*c* is rated at 100 A, by including two fusible elements 100 of the fuse 101-1*c*, the current rating of the fuse 101-1*d* is increased to 200 A, and by including four fusible elements 100 of the fuse 101-1*c*, the current rating of the fuse 101-1*e* is increased to 400 A FIG. 2A-2B show the elongated metal element 115. FIG. 2A is a perspective view of the elongated metal element 115. FIG. 2B is a top view of the elongated metal element 115. In the exemplary embodiment, the elongated metal element 115 is stamped from a planar sheet of metal or metal alloy. In some embodiments, the elongated metal element 115 is formed with an opening 210 in the planar sheet of metal or metal alloy 115.

Figure 3A:
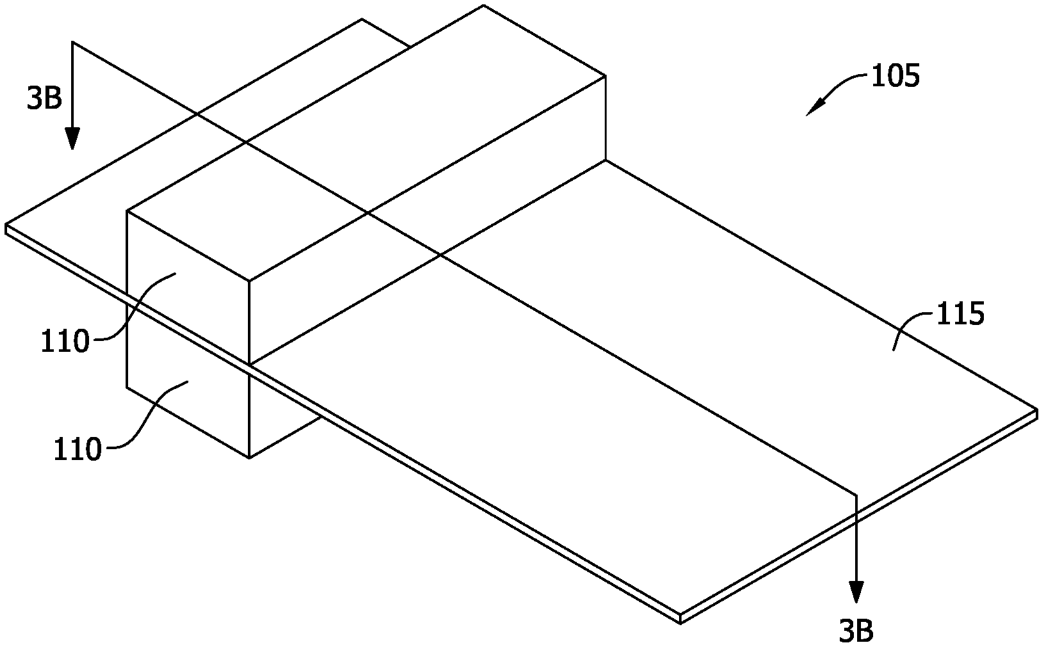
FIG. 3A is a perspective view of an exemplary trigger element of the electrical fuses shown in FIGS. 1A and 1C-1E.
Figure 3B:
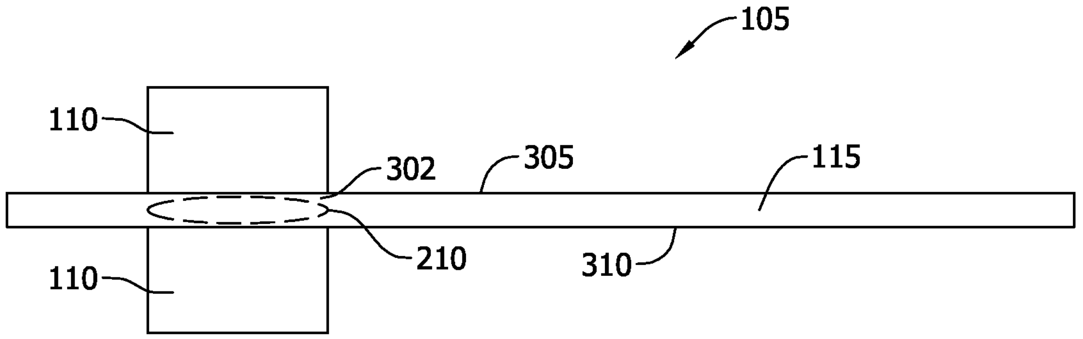
FIG. 3B is a cross-sectional view of the trigger element along cross-sectional line 3B-3B in FIG. 3A.

FIGS. 3A and 3B illustrate the trigger element 105 formed with the elongated metal element 115 shown in FIGS. 2A and 2B. FIG. 3A is a perspective view of the trigger element 105. FIG. 3B is a cross-sectional view of the trigger element 105 taken along cross-sectional line 3B-3B in FIG. 3A. In the exemplary embodiment, a portion of the elongated copper metal element 115 is overlaid with tin 110. The planar sheet of metal or metal alloy 115 defines the opening 210 (also see FIGS. 2A and 2B), The elongated metal element 115 defines an upper major surface 305 and a lower major surface 310. The tin 110 may be overlaid on both the upper major surface 305 and the lower major surface 310 of the planar sheet of metal or metal alloy 115, covering the opening 210. The opening 210 defines narrowed sections 202 (FIGS. 2A and 2B) in the elongated metal element 115, which has a smaller cross-sectional area than the remaining of the elongated metal element 115 therefore current density at the narrowed section is higher than the remaining of the metal element. As a result, temperature rises are greater at the narrowed sections 202 where the metal material 110 locates, than the remaining area of the elongated metal element 115, causing the metal material 110 to melt, diffuse to the elongated metal element 115, and lower the melting temperature of the elongated metal element 115 at the areas 302 (FIG. 3B) covered by the metal material 110 and/or adjacent the metal material 110. After a predetermined time, the elongated metal element 115 at the areas 302 melts and disconnects the circuit, protecting the connected circuitry. Besides providing narrowed sections 202, the opening 210 serves as a marker in positioning the metal material 110 during the manufacturing of the trigger element 105.

In some embodiments, the trigger element 105 includes a plurality of openings 210. A plurality of openings 210 increases current density at the narrowed sections 202 by reducing the cross-sectional areas at the narrowed sections, thereby reducing the response time of the trigger element 105.

Figure 4:
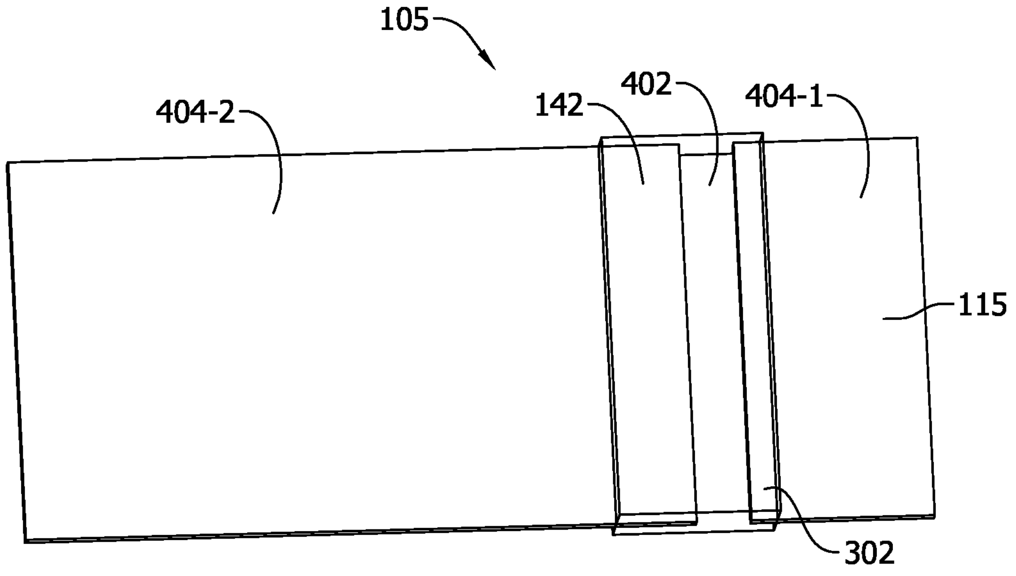
FIG. 4 is a perspective view of another exemplary trigger element of the electrical fuses shown in FIGS. 1A and 1C-1E.

FIG. 4 shows another embodiment of the trigger element 105. Compared to the trigger element 105 shown in FIGS. 3A and 3B, which includes an opening 210 on the elongated metal element 115, the trigger element 105 includes a gap 402 defined by two portions 404-1, 404-2 of the elongated metal element 115. The gap 402 extends through the elongated metal element 115 along the radial or short direction of the elongated metal element 115. The two portions 404 may both be planar sheets of metal or metal alloy. The two portions 404 may be fabricated by the same mechanism such as stamping. The metal material 110 is positioned over and covers the gap 402. In operation, when overload current flows through the trigger element 105, the metal material 110 melts first because tin has a lower melting temperature than copper of the elongated metal element 115. The melted tin diffuses into copper of the elongated metal element 115, lowering the melting temperature of the elongated metal element 115 at the area 302 overlaid by the metal material 110 and/or adjacent the metal material 110. After a period of the time, the metal material 110 and the elongated metal element 115 at the area 302 are melted, enlarging the gap 402. As a result, the circuit is disconnected.

Figure 5:
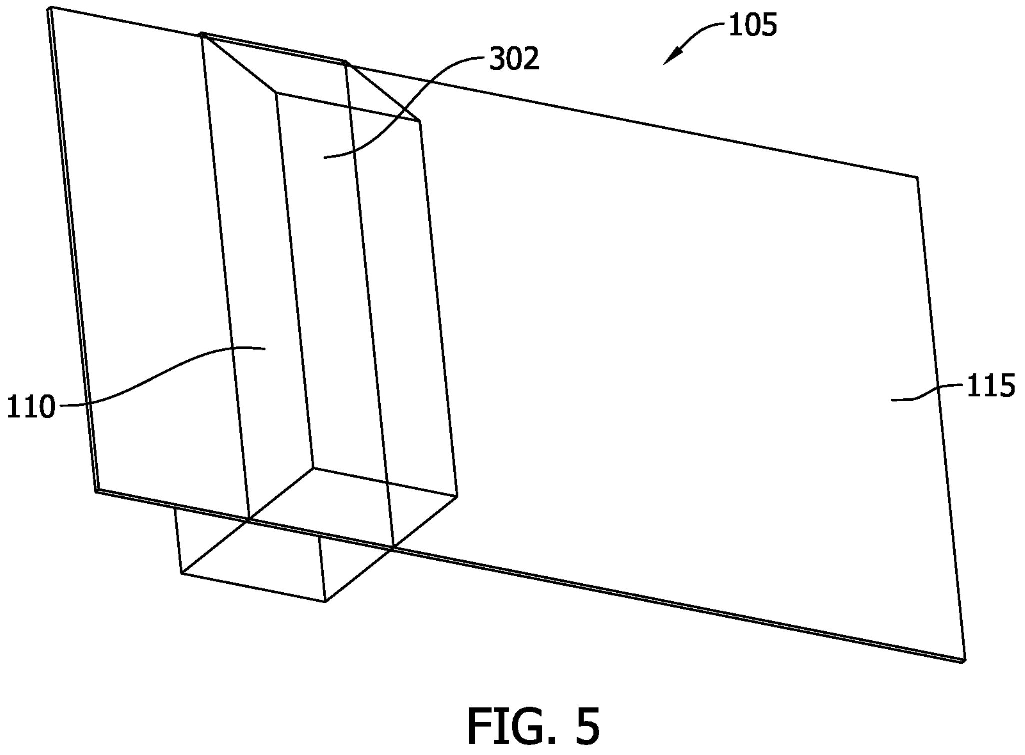
FIG. 5 is a perspective view of one more exemplary trigger element of the electrical fuses shown in FIGS. 1A and 1C-1E.

FIG. 5 shows one more embodiment of the trigger element 105. Compared to the trigger element 105 shown in FIGS. 3A-4, the elongated metal element 115 does not have an opening 210 or a gap 402, and but the metal material 110 still overlays the elongated metal element 115. In operation, when overload current flows through the elongated metal element 115, the metal material 110 melts and diffuses into copper of the elongated metal element 115, lowering the melting temperature of the metal at the area 302 overlaid by the metal material 110 and/or adjacent the metal material 110. After a period of time, the metal material 110 and the elongated metal element 115 at the area 302 are melted, disconnecting the circuit.

Whether to include an opening or gap, the number of openings, and the sizes of the opening or gap may be adjusted to adjust the response time of the trigger element 105. Current density at the areas adjacent the opening 210 is increased compared to other areas of the elongated metal element 115 or compared to the elongated metal element 115 that does not have an opening, thereby reducing the melting time of the M-effect element 105 and shortening the response time of the fuse 101 to an overload condition. Having the gap 402 also reduces the response time of the trigger element 105 because tin has a lower melting temperature than the eutectic material of tin and copper and melts and disconnects the circuit faster than the trigger element 105 having the opening 210 (FIGS. 3A and 3B) or not having the opening 210 or the gap 402.

Compared to the known mechanical trigger, trigger element 105 may be used for a range of current ratings without adjustment of the size of the elongated metal element 115 for every current rating. For example, a trigger element 105 for a fuse rated at 100 A may be the same as the trigger element 105 for a fuse rated at 90 A. In some embodiments, the thickness of the elongated metal element 115 may be adjusted by increasing the thickness of the elongated metal element 115 for a higher current rating. The mass of the metal material 110 may remain the same across different current ratings. Compared to the known mechanical trigger, which may include 0.2 g of tin, the trigger element 105 includes greatly increased mass of tin, e.g., 1.7 g, in the metal material 110. The metal material 110 serves as a heat sink to slow down the melting of the elongated metal element 115 during the overload condition. Although heat increases as current increases, the effect of the changes in heat on the metal material 110 is not as noticeable as on the known trigger element such that redesign of the trigger element 105 is not necessary for the trigger element 105 to meet the performance requirements under a standard, such as a UL standard. Under the UL standard, the response time of a trigger in a dual-element fuse should be 10 s or more when 500% of the rated current flows through the fuse, should be 480 s or more when 200% of the rated current flows through the fuse, and should be 7200 s or more when 135% of the rated current flows through the fuse. The trigger element 105 disclosed herein may be used in fuses that have a current rating from 35 A up to 600 A and meet the UL standards. For example, the fuse 101 having a current rating from 35 A to 600 A and including the trigger element 105 provides a minimum of 10 s delay when 500% of rated current flows through the fuse. In some embodiments, the fuse 101 has a voltage rating of 600 VAC for alternate current (AC) and 300 VDC for direct current (DC). In one embodiment, the fuse 101 has an interrupting rating of 300 kA Vac RMS (root of mean squared).

Figure 6:
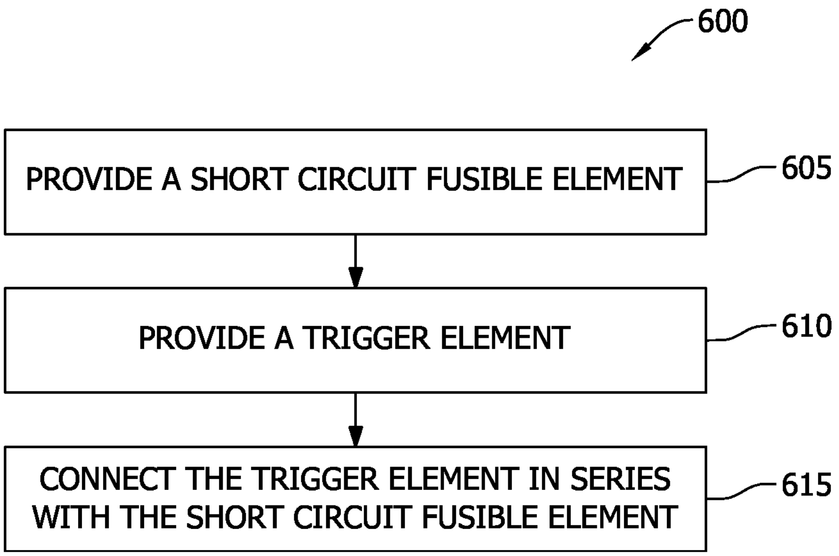
FIG. 6 is a flow chart illustrating an exemplary method of assembling the electrical fuse shown in FIGS. 1A-5.

FIG. 6 is a flow chart illustrating an exemplary method 600 of assembling a dual-element electrical fuse. Dual-element electrical fuse may be the electrical fuse 101 described above. The method 600 includes providing 605 a short circuit fusible element. The short circuit fusible element may be the short circuit fusible element 109 described above. The method 600 also includes providing 610 a trigger element 105. The trigger element 105 may be assembled by a molding process. For example, a mold of metal material 110 is placed at the elongated metal element 115. In some embodiments, an upper mold and a lower mold are provided and placed above the elongated metal element 115 and below the elongated metal element 115, respectively. In one example, the opening 210 serves as a marker, and the upper mold and the lower mold are provided and placed above the elongated metal element 115 or below the elongated metal element 115, covering the opening 210. Melted tin or tin mixture is poured into the mold. Once the metal material 110 is cooled and hardened, the mold(s) are removed. The method 600 further includes connecting 615 the trigger element in series with the short circuit fusible element.

The benefits and advantages of the present disclosure are now believed to have been amply illustrated in relation to the exemplary embodiments disclosed.

At least one technical effect of the assemblies and methods described herein includes (a) chemically activated dual-element electrical fuse; (b) a dual-element electrical fuse without adjustment to the trigger element for each current rating; and (c) a simplified trigger element of a dual-element electrical fuse.

An embodiment of an electrical fuse is disclosed. The electrical fuse includes a short circuit fusible element and a trigger element connected in series with the short circuit fusible element. The trigger element is chemically activated rather than mechanically activated to interrupt a predefined overload condition with a predetermined time delay.

Optionally, the trigger element includes a freestanding planar sheet metal element. The sheet metal element is a stamped planar sheet of metal or metal alloy. The sheet metal element includes copper. A portion of the copper is overlaid with tin. The sheet metal element defines an opening, and wherein the opening is covered by the tin. Alternatively, the sheet metal element does not define an opening that is covered by the tin. Optionally, the sheet metal element defines a gap separating the sheet metal element into a first portion and a second portion, and the gap is covered by the tin. The electrical fuse further includes an arc barrier material, the arc barrier material extending between the tin and the short circuit fusible element. The arc barrier material includes a silicone material. Alternatively, the silicone material is a room temperature vulcanizing material. The arc barrier material extends on opposing sides of the tin. Alternatively, the arc barrier material surrounds the tin. The sheet metal element includes an upper major surface and a lower major surface opposing the upper major surface, and wherein portions of each of the upper and lower major surfaces are overlaid with the tin. The short circuit fusible element includes at least first and second perforated walls fabricated from a metal or metal alloy, the first and second perforated walls extending in spaced apart but generally parallel planes to one another. The short circuit fusible element further including a third perforated wall extending perpendicularly to and between the first and second perforated walls. The trigger element extends parallel to the first and second perforated walls. The trigger element includes a sheet metal element provided with a Metcalf-effect element. The electrical fuse has an amperage rating of 35 A to 600 A. The trigger element is operable with a minimum 10 second time delay at 500% of rated current.

While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from those described and depicted without departing from inventive concepts described. Also, in certain embodiments, certain components in the assemblies described may be omitted to accommodate particular types of electrical fuses or the needs of particular installations, while still providing the needed performance and functionality of the electrical fuses.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical fuse comprising:

a short circuit fusible element configured to interrupt a high overcurrent corresponding to a short circuit condition, wherein the short circuit fusible element comprises first and second perforated walls, the first and second perforated walls extending in spaced apart parallel planes to one another;

a trigger element connected in series with the short circuit fusible element, wherein the trigger element comprises a pair of metal elements separated by a gap, the gap extending through a full cross-sectional area of each of the pair of metal elements, the gap covered by a filler element comprising tin such that at least a portion of the filler element is electrically connected in series with each of the pair of metal elements; and an arc barrier material locally disposed on opposing sides of the filler element and comprising a silicone material, wherein the trigger element is configured to interrupt a predefined overload condition with a predetermined time delay, the overload condition comprising a low overcurrent through the trigger element lower than the high overcurrent, wherein the filler element covering the gap is configured as a heat sink to delay a rate of temperature increase and delay melting of the filler element based on a flow of the low overcurrent through the trigger element, and wherein at least a portion of the filler element is configured to diffuse into at least one of the pair of metal elements under the predefined overload condition to permit the trigger element to provide the predetermined time delay for interrupting the predefined overload condition.

2. The electrical fuse of claim 1, wherein the pair of metal elements comprise an identical metal.

3. The electrical fuse of claim 2, wherein each of the pair of metal elements comprises a planar sheet of metal or metal alloy.

4. The electrical fuse of claim 2, wherein each of the pair of metal elements comprises copper.

5. The electrical fuse of claim 1, wherein at least one of the pair of metal elements comprises copper, and wherein a portion of the copper is overlaid with tin.

6. The electrical fuse of claim 1, wherein at least one of the pair of metal elements defines an opening, and wherein the opening is covered by tin.

7. The electrical fuse of claim 1, wherein the arc barrier material extends between the filler element and the short circuit fusible element.

8. The electrical fuse of claim 1, wherein the silicone material is a room temperature vulcanizing material.

9. The electrical fuse of claim 7, wherein the arc barrier material extends on opposing sides of the filler element.

10. The electrical fuse of claim 7, where the arc barrier material surrounds the filler element.

11. The electrical fuse of claim 1, wherein at least one of the pair of metal elements includes an upper surface and a lower surface opposing the upper surface, and wherein portions of each of the upper and lower surfaces are overlaid with the filler element.

12. The electrical fuse of claim 1, the short circuit fusible element further comprising a third perforated wall extending perpendicularly to and between the first and second perforated walls.

13. The electrical fuse of claim 12, wherein the trigger element extends parallel to the first and second perforated walls.

14. The electrical fuse of claim 1, wherein at least one of the pair of metal elements is provided with a Metcalf-effect element.

15. The electrical fuse of claim 14, wherein the electrical fuse has an amperage rating of 35 A to 600 A.

16. The electrical fuse of claim 15, wherein the trigger element is operable with a minimum 10 second time delay at 500% of rated current.

17. The electrical fuse of claim 1, wherein the filler element comprises a block of filler material filling the gap and encasing at least a portion of each of one or more planar surfaces of one or more of the pair of metal elements.

18. The electrical fuse of claim 17, wherein the block of filler material encases at least a portion of a top planar surface and at least a portion of a bottom planar surface of each of the pair of metal elements.

19. The electrical fuse of claim 1, wherein a first portion of the arc barrier material is provided abutting the filler element and disposed between the short circuit fusible element and the filler element.

20. The electrical fuse of claim 19, wherein the filler element is disposed between the first portion of the arc barrier material and a second portion of the arc barrier material.

* * * * *